(12) United States Patent
Wu et al.

(10) Patent No.: US 8,238,675 B2
(45) Date of Patent: Aug. 7, 2012

(54) SPECTRAL INFORMATION RECOVERY FOR COMPRESSED IMAGE RESTORATION WITH NONLINEAR PARTIAL DIFFERENTIAL EQUATION REGULARIZATION

(75) Inventors: Feng Wu, Beijing (CN); Jingjing Fu, Hefei (CN); Bing Zeng, Hksar (CN)

(73) Assignee: Microsoft Corporation, Redmond, WA (US)

( * ) Notice: Subject to any disclaimer, the term of this patent is extended or adjusted under 35 U.S.C. 154(b) by 1144 days.

(21) Appl. No.: 12/054,363

(22) Filed: Mar. 24, 2008

(65) Prior Publication Data

US 2009/0238476 A1   Sep. 24, 2009

(51) Int. Cl.
  *G06K 9/36* (2006.01)
(52) U.S. Cl. ............ 382/233; 375/240.18; 708/203
(58) Field of Classification Search ............ 382/233; 375/240.18; 708/203
  See application file for complete search history.

(56) References Cited

U.S. PATENT DOCUMENTS

| | | | |
|---|---|---|---|
| 5,293,434 A * | 3/1994 | Feig et al. | 382/234 |
| 5,367,629 A | 11/1994 | Chu et al. | |
| 5,455,778 A * | 10/1995 | Ide et al. | 703/1 |
| 5,719,963 A | 2/1998 | Kazui et al. | |
| 5,737,451 A * | 4/1998 | Gandhi et al. | 382/268 |
| 5,850,294 A | 12/1998 | Apostolopoulos et al. | |
| 5,850,484 A | 12/1998 | Beretta et al. | |
| 5,933,542 A | 8/1999 | Chang et al. | |
| 5,937,101 A | 8/1999 | Jeon et al. | |
| 5,970,172 A * | 10/1999 | Mochizuki | 382/233 |
| 5,974,196 A | 10/1999 | Chang et al. | |
| 6,324,301 B1 | 11/2001 | Jacquin et al. | |
| 6,434,273 B1 | 8/2002 | Gillman et al. | |
| 6,760,487 B1 | 7/2004 | Linares | |
| 2005/0190189 A1 * | 9/2005 | Chefd'hotel et al. | 345/501 |
| 2006/0050783 A1 | 3/2006 | Le Dinh et al. | |
| 2006/0129366 A1 * | 6/2006 | Shaw | 703/10 |
| 2007/0179762 A1 * | 8/2007 | Sato et al. | 703/2 |
| 2008/0126278 A1 * | 5/2008 | Bronstein et al. | 706/17 |

FOREIGN PATENT DOCUMENTS

WO   WO0207438 A1   1/2002

OTHER PUBLICATIONS

Valova et al.; "Hadamard-based image decomposition and compression"; IEEE information technology in biomedicine, vol. 4, No. 4, Dec. 2000.*

Lakhani; "Improved equations for JPEG's blocking artifacts reduction approach"; IEEE circuits and system for video technology; vol. 7, No. 6, Dec. 1997.*

(Continued)

*Primary Examiner* — Chan S Park
*Assistant Examiner* — Eueng-Nan Yeh
(74) *Attorney, Agent, or Firm* — Lyon & Harr, LLP; Mark A. Watson

(57) ABSTRACT

Aspects of the subject matter described herein relate to image restoration for compressed images. In aspects, image restoration is accomplished by recovering spectral information from data corresponding to a compressed image. The spectral information is recovered using an algorithm to search through a solution space of possible solutions while constraints are imposed on the solution space to trim undesirable solutions from the space. An algorithm described herein may be iteratively applied to improve the quality of the recovered image.

15 Claims, 6 Drawing Sheets

OTHER PUBLICATIONS

Rhee et al., "DCT-Based Regularized Algorithm for High-Resolution Image Reconstruction", International Conference on Image Processing, vol. 3, 1999, IEEE, pp. 184-187, Jun. 22-24, 1999.

Comes et al., "Postprocessing of Images by Filtering the Unmasked Coding Noise", IEEE Transactions on Image Processing, vol. 8, Issue 8, Aug. 1999, IEEE, pp. 1050-1062.

Lopez et al., "JPEG Post Processing Image Enhancement", International Conference on Neural Networks, vol. 3, Jun. 9-12, 1997, IEEE, pp. 1496-1500.

Kuo et al., "Adaptive postprocessor for block encoded images", IEEE Transactions on Circuits and Systems for Video Technology, vol. 5, Issue 4, Aug. 1995, pp. 298-304.

Minami et al., "An Optimization Approach for Removing Blocking Effects in Transformcoding", Data Compression Conference, IEEE, 1991, p. 1, Apr. 8-11, 1991.

Yang et al., "Removal of Compression Artifacts Using Projections onto Convex Sets and Line Process Modeling", IEEE Transactions on Image Processing, vol. 6, Issue 10, Oct. 1997, IEEE, pp. 1345-1357.

Reininger et al., "Distributions of the Two-Dimensional DCT Coefficients for Images", IEEE Transactions on Communications, vol. 31, No. 6, Jun. 1983, IEEE, pp. 835-839.

Schultz et al., "Stochastic Modeling and Estimation of Multispectral Image Data", IEEE Transactions on Image Processing, vol. 4, Issue 8, Aug. 1995, pp. 1-15.

Robertson et al., DCT Quantization Noise in Compressed Images, IEEE Transaction on Circuits and Systems for Video Technology, vol. 15, Issue 1, Jan. 2005, pp. 32.

Rudin et al., "Nonlinear Total Variation Based Noise Removal Algorithms", Physica D, vol. 60, Issue 1-4, 1992 Elsevier Science Publishers B.V., pp. 259-268, Nov. 1, 1992.

Weickert, "Anisotropic Diffusion in Image Processing—Book", ECMI Series, Teubner-Verlag, 1998, pp. 2, (published before this application Mar. 2008).

Kornprobst et al., "Nonlinear Operators in Image Restoration", Proceedings of the 1997 Conference on Computer Vision and Pattern Recognition (CVPR '97), Jun. 17-19, 1997, IEEE, pp. 6.

Tschumperle et al., "Vector-Valued Image Regularization with PDE's: A Common Framework for Different Applications", IEEE Computer Society Conference on Computer Vision and Pattern Recognition, 2003, vol. 1, Jun. 18-20, 2003, IEEE, pp. 6.

O'Rourke et al., "Improved Image Decompression for Reduced Transform Coding Artifacts", IEEE Transactions on Circuits and Systems for Video Technology, vol. 5, Issue 6, pp. 11, Feb. 1994.

Lakhani., Distribution-Based Restoration of DCT Coefficients, IEEE Transactions on Circuits and Systems for Video Technology, vol. 10, No. 5, Aug. 2000, pp. 819-823.

* cited by examiner

SPECTRAL INFORMATION RECOVERY FOR COMPRESSED IMAGE RESTORATION WITH NONLINEAR PARTIAL DIFFERENTIAL EQUATION REGULARIZATION

BACKGROUND

Joint Photographs Expert Group (JPEG) is widely used for image compression for images accessible via the Internet owing to good performance with moderate implementation complexity. JPEG uses the block-based discrete cosine transform (DCT) coding architecture, which suffers from block artifacts when the compression ratio is high. This can be seen in the blocking and ringing that exists in many JPEG images available via the Internet.

SUMMARY

Briefly, aspects of the subject matter described herein relate to image restoration for compressed images. In aspects, image restoration is accomplished by recovering spectral information from data corresponding to a compressed image. The spectral information is recovered using an algorithm to search through a solution space of possible solutions while constraints are imposed on the solution space to trim undesirable solutions from the space. The algorithm may be iteratively applied to improve the quality of the recovered image.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Figure 1:
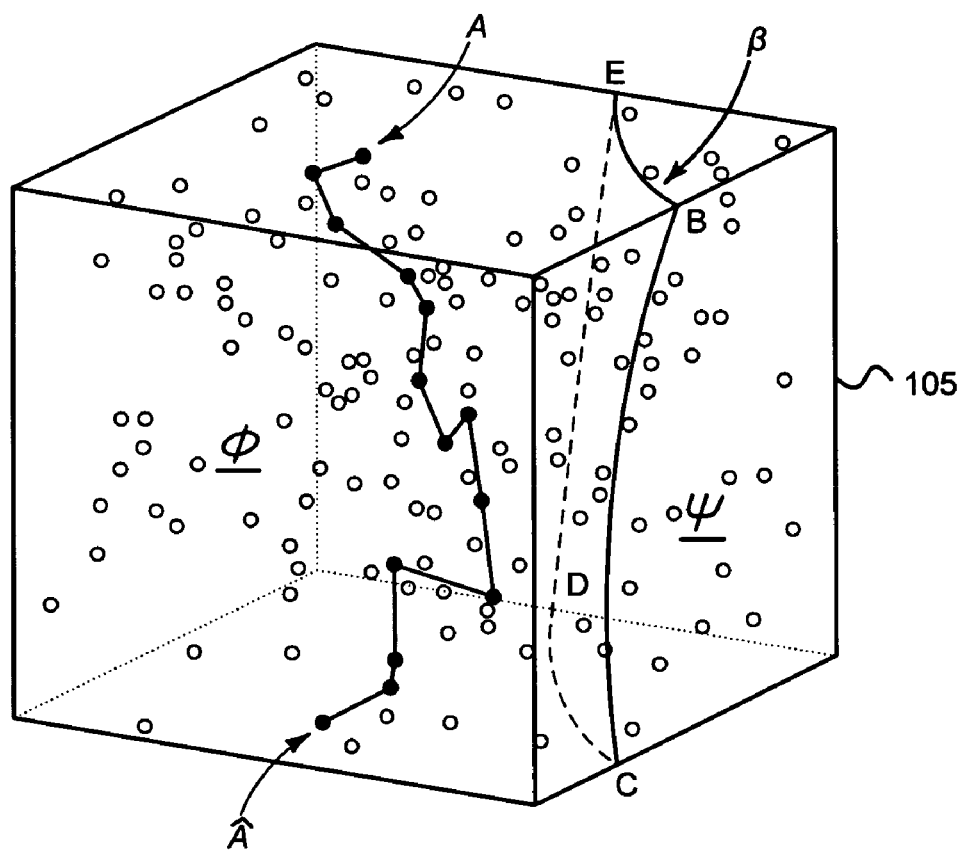
FIG. 1 is a diagram that generally represents finding a route using constraints according to aspects of the subject matter described herein.

As mentioned previously, JPEG images often exhibit artifacts that are undesirable. Removing or diminishing these artifacts is a challenge. Image degradation may be formulated as follows:

$$g = Hf + n. \quad (1)$$

The vectors g and f denote the observed and the original images, respectively. H is a convolution matrix to model the blurring, and n represents random additive noise. Recovering the original signal f from the noisy signal g is a difficult challenge. To attempt to recover f, nonlinear regularization with partial differential equations (PDE) may be employed. Recovering f in this manner may preserve significant global features while smoothing unimportant data. Nonlinear regularization may involve functional minimization, variational approaches, oriented Laplacians, other techniques, some combination of the above, and the like.

In JPEG images, at least some of the distortion is caused by the quantization of coefficients. By using the compression standard and parsing data compressed via an algorithm such as JPEG, the quantization algorithm and its parameters can be ascertained. Image restoration may be performed by considering the recovery of spectral information. In order to achieve this, image recovery may be translated to route establishment in a high dimensional vector space that is spanned by all DCT coefficients. In one embodiment, total variation regularization may be used to obtain an initial estimate the route nodes. This route may then be refined using two spectral constraints. The first constraint is quantization bound, and the second one is a low-frequency AC coefficient limitation, which is obtained via a prediction method described herein.

In JPEG, block-based DCTs are used, where an image is divided into blocks with a fixed size for the discrete cosine transform. In addition, the transformed coefficients are quantized to scalar values, which can be scaled up to reconstruct an image in a decoder. Let the original image scan be is denoted as f. It consists of K×L blocks with block size equal to N×N.

$$f = \begin{bmatrix} a^{1,1} & \cdots & a^{1,L} \\ \vdots & \ddots & \vdots \\ a^{K,1} & \cdots & a^{K,L} \end{bmatrix}, \text{ where } a^{m,n} = \begin{bmatrix} a^{m,n}_{1,1} & \cdots & a^{m,n}_{1,N} \\ \vdots & \ddots & \vdots \\ a^{m,n}_{N,1} & \cdots & a^{m,n}_{N,N} \end{bmatrix}. \quad (2)$$

$a^{m,n}$ is the (m,n)-th image block. The transform results of original block $a^{m,n}$ are expressed as $A^{m,n}$ $$A^{m,n} = H a^{m,n}, \text{ where } A^{m,n} = \begin{bmatrix} A^{m,n}_{1,1} & \cdots & A^{m,n}_{1,N} \\ \vdots & \ddots & \vdots \\ A^{m,n}_{N,1} & \cdots & A^{m,n}_{N,N} \end{bmatrix}. \quad (3)$$

The symbol H stands for transform operator, while $H^{-1}$ represents an inverse transform. $Q[\bullet]$ is quantization operator implemented on the transformed coefficients $$\hat{A}^{m,n} = Q[Ha^{m,n}]. \quad (4)$$

$\hat{A}^{m,n}$ is the quantized version of the transformed coefficient block, $a^{m,n}$, while the relevant decoded block is $\hat{a}^{m,n}$. The reconstruction in the JPEG standard can be expressed as follows:

$$\hat{a}^{m,n} H^{-1} Q[Ha^{m,n}]. \quad (5)$$

The reconstructed image g is composed of K×L decoded blocks. As the result of quantization error, both blocking and ringing artifacts may exist in the reconstructed image g when the compression ratio is high $$g = \begin{bmatrix} \hat{a}^{1,1} & \cdots & \hat{a}^{1,L} \\ \vdots & \ddots & \vdots \\ \hat{a}^{K,1} & \cdots & \hat{a}^{K,L} \end{bmatrix}. \quad (6)$$

Spectral information ($A^{m,n}$) recovery may be used to compensate the quantization error.

For each N×N block in an image, the DCT coefficients matrix $A^{m,n}$ can be regarded as a vector in $N^2$-dimensional vector space $\mathcal{R}^{N^2}$. According to the quantization rule, the high dimensional vector space is divided into numerous sub-spaces by quantization intervals of coefficients, and one typical vector may be chosen to represent all vectors within one sub-space. The quantization is equivalent to the behavior of locating $A^{m,n}$ and outputting the typical vector $\hat{A}^{m,n}$. Since $\hat{A}^{m,n}$ is prior knowledge on the original DCT coefficients $A^{m,n}$, the recovery question turns to in what ways the initial state $\hat{A}^{m,n}$ can approach to $A^{m,n}$ in a bounded high dimensional space.

FIG. 1 is a diagram that generally represents finding a route using constraints according to aspects of the subject matter described herein. The cube 105 is part of a bounded sub-space. The circles in the cube represent possible states of A. The filled in circles represent the determined recovery route from A to Â. The original DCT coefficient vector is denoted as A, and the quantized coefficient vector is Â. In order to determine A from Â, a recovery route is built. In one embodiment, minimizing the distance between A and Â by iteration may produce a group of estimated nodes $\tilde{A}^i$, which can form a near-optimal recovery route. However, minimization of the distance may be impractical because the original coefficient vector A may be unavailable in the decoder.

Besides the initial route construction, the pruning of the sub-space will restrict the recovery route from deviation. For example, if it is perceived that the destination is impossible to locate in hyperspace ψ (i.e., the back side of the surface β in FIG. 1 which meets the cube edges at points BCDE), the recovery route can be expanded only in the feasible space φ other than the whole space. Furthermore, if the estimated route bumps into the surface β, the relevant end node is reflected back to the feasible space φ.

To search for a route, at least two problems exist: how to construct recovery route and how to prune the sub-space. In one embodiment, space pruning is combined with the route node decision. And the recovery route construction is treated as solving the following optimization with space constraints:

Min $E(f)$, s.t. $H a^{m,n} \in U_2^{m,n}$, while $U_2^{m,n} \subset U_1^{m,n} \subset \mathcal{R}^{N^2}$. (7)

$E(f)$ is an objective function for minimization, and $U_2^{m,n}$ is the space constraint on $N^2$-dimensional vector space $\mathcal{R}^{N^2}$. To solve this constrained optimization problem, the dynamic adjustment is implemented in both spatial and spectral domains because the signal f and the sub-space $U_2^{m,n}$ are in different domains. The near-estimated route nodes are selected by an iterative minimization algorithm in spatial domain first. Once the result of the iteration goes outsides the feasible space $U_2^{m,n}$, the outranging entries of the result will be modified to the typical value.

The division between feasible space and unavailable space is a space pruning problem, which is realized by several constraints. In one embodiment, two constraints are used for space pruning. After the first constraint is applied, the space $\mathcal{R}^{N^2}$ is shrunk to $U_1^{m,n}$. After the second constraint is applied, $U_1^{m,n}$ is further shrunk to $U_2^{m,n}$. In other embodiments, more space constraints for space pruning may be introduced to clip the space to $U_x^{m,n}$ ($x \geq 3$).

Route Construction

In one embodiment, minimization may be solved with partial differential equations (PDE's). In a PDE-based solution, the signals are iteratively regularized with the evolution time going by, so that step-wise route construction can be implemented. In one embodiment, total variation based algorithms may be used for image processing. In other embodiments, other PDE-based algorithms mentioned previously may be applied. One exemplary total variation (TV) regularization that may be used as a dynamic adjustment scheme in the spatial domain is:

$$\min \int_\Omega |\nabla f| + \frac{\lambda}{2} \int_\Omega |f - g|^2, \text{ where } \nabla f = \sqrt{f_x^2 + f_y^2}. \quad (8)$$

The first part of equation 8 above is a total variation item for regularization, while the second part of the formula is a fidelity term, which prevents an iterative solution from unacceptable deviation. With the two constraints mentioned previously, the fidelity term may be discarded. The dynamic adjustment may be calculated by solving the Euler-Lagrange equation and assigning evolution time dt.

$$f^{i+1} = \tilde{f}^i + \tilde{f}_t^i \cdot dt. \quad (9)$$

$f^{i+1}$ is the result of i+1 time iterations, while $\tilde{f}^i$ is the reconstruction image from estimated route nodes $\{\tilde{A}^{m,n,i}\}_{K \times L}$ in the i-th step. The partial differential of $\tilde{f}^i$ on evolution time t is denoted as $f_t^i$, which is indicated by equation 10 below:

$$\tilde{f}_t^i = \frac{\partial}{\partial x}\left(\frac{\tilde{f}_x^i}{\sqrt{(\tilde{f}_x^i)^2 + (\tilde{f}_y^i)^2}}\right) + \frac{\partial}{\partial y}\left(\frac{\tilde{f}_y^i}{\sqrt{(\tilde{f}_x^i)^2 + (\tilde{f}_y^i)^2}}\right) \quad (10)$$

where $$f^{i+1} = \begin{bmatrix} a^{1,1,i+1} & \cdots & a^{1,L,i+1} \\ \vdots & \ddots & \vdots \\ a^{K,1,i+1} & \cdots & a^{K,L,i+1} \end{bmatrix} \text{ and }$$

$$\tilde{f}^i = \begin{bmatrix} \tilde{a}^{1,1,i} & \cdots & \tilde{a}^{1,L,i} \\ \vdots & \ddots & \vdots \\ \tilde{a}^{K,1,i} & \cdots & \tilde{a}^{K,L,i} \end{bmatrix}.$$

Constraining the Route

As mentioned previously, the final destination $A^{m,n}$ is constrained to be inside a sub-space $U_1^{m,n}$, which is defined as:

$U_1^{m,n} = \{A \in \mathcal{R}^{N^2} | Bl_{i,j}^{m,n} \leq A_{i,j} < Bh_{i,j}^{m,n}, i,j \in N\}$, where $Bl_{i,j}^{m,n} = \hat{A}_{i,j}^{m,n} - \Delta l_{i,j,q}$, $Bh_{i,j}^{m,n} = \hat{A}_{i,j}^{m,n} + \Delta u_{i,j,q}$. (11)

$\hat{A}_{i,j}^{m,n}$ stands for the (i,j)-th entry of a typical vector $\hat{A}^{m,n}$. $\Delta l_{i,j,q}$ and $\Delta u_{i,j,q}$ are the distances from the typical vector to the lower bound $Bl_{i,j}^{m,n}$ in and upper bound $Bh_{i,j}^{m,n}$ of quantized interval in the (i, j) coordinate.

For further space pruning, an AC prediction method based on DC coefficients may be used as described below. In this algorithm, when four neighboring blocks only have DC components left after quantization, DC components of these blocks are utilized to predict three low frequency AC coefficients denoted as $\overline{A}_{i,j}^{k,l}$. After predication, the allowable evaluation range of the AC coefficients reduces to the new bounded scope. As the result, the sub-space $U_1^{m,n}$ is clipped to sub-space $U_2^{m,n}$, which is more constrained as indicated by equation 12 below:

$$U_2^{m,n} = \{A \in \mathcal{R}^{N^2} | A_{i,j} \in [Bl_{i,j}^{m,n}, Bh_{i,j}^{m,n}], i,j=1,2 \text{ and } (i,j) \neq (1,1)\}. \quad (12)$$

Where, the lower bound and upper bound in $A_{i,j}$ dimension are modified as:

$$Bl_{i,j}^{m,n} = \begin{cases} \max\left(\overline{A}_{i,j}^{m,n} - \frac{\Delta l_{i,j,q}}{2}, \hat{A}_{i,j}^{m,n} - \Delta l_{i,j,q}\right) & \text{if } \overline{A}_{i,j}^{m,n} \in [\hat{A}_{i,j}^{m,n} - \Delta l_{i,j,q}, \hat{A}_{i,j}^{m,n} + \Delta u_{i,j,q}] \\ \hat{A}_{i,j}^{m,n} - \Delta l_{i,j,q}, & \text{otherwise} \end{cases} \quad (13)$$

$$Bh_{i,j}^{m,n} = \begin{cases} \min\left(\overline{A}_{i,j}^{m,n} + \frac{\Delta u_{i,j,q}}{2}, \hat{A}_{i,j}^{m,n} + \Delta u_{i,j,q}\right) & \text{if } \overline{A}_{i,j}^{m,n} \in [\hat{A}_{i,j}^{m,n} - \Delta l_{i,j,q}, \hat{A}_{i,j}^{m,n} + \Delta u_{i,j,q}] \\ \hat{A}_{i,j}^{m,n} + \Delta u_{i,j,q}, & \text{otherwise} \end{cases}$$

$i, j = 1, 2$ and $(i, j) \neq (1, 1)$.

The typical vector of $U_2^{m,n}$ is specified as:

$$B^{m,n} = \{B_{i,j}^{m,n}\}_{N \times N}, \text{ where} \quad (14)$$

$$B_{i,j}^{m,n} = \begin{cases} \overline{A}_{i,j}^{m,n} & \text{if } i, j = 1, 2 \text{ and } (i, j) \neq (1, 1) \\ \hat{A}_{i,j}^{m,n} & \text{otherwise} \end{cases}$$

During route construction, the estimated route nodes are bounded in sub-space $U_2^{m,n}$. In case the iterative result of regularization goes outside the space limitation in one coordinate, the relevant entry will be corrected to typical vectors as:

$$\tilde{A}^{m,n} = SA, \text{ where } \tilde{A}_{i,j}^{m,n} = \begin{cases} B_{i,j}^{m,n} & \text{if } A_{i,j} \notin [Bl_{i,j}^{m,n}, Bh_{i,j}^{m,n}] \\ A_{i,j} & \text{otherwise} \end{cases} \quad (15)$$

The symbol S is a correction operator in terms of space constraints. A is the near-estimated route node, and $\tilde{A}^{m,n}$ is the estimated route node for the next step regularization.

DC Based Low-Frequency AC Prediction

With the increase of quantization intervals, not only the texture and edge information are effaced but also the gradual variation in smooth area vanishes. For the blocks with gradual variation, the low frequency AC coefficients ($A_{1,2}, A_{2,1}, A_{2,2}$) may contain valuable gradient information due to the properties of these three AC coefficients.

Figure 2:
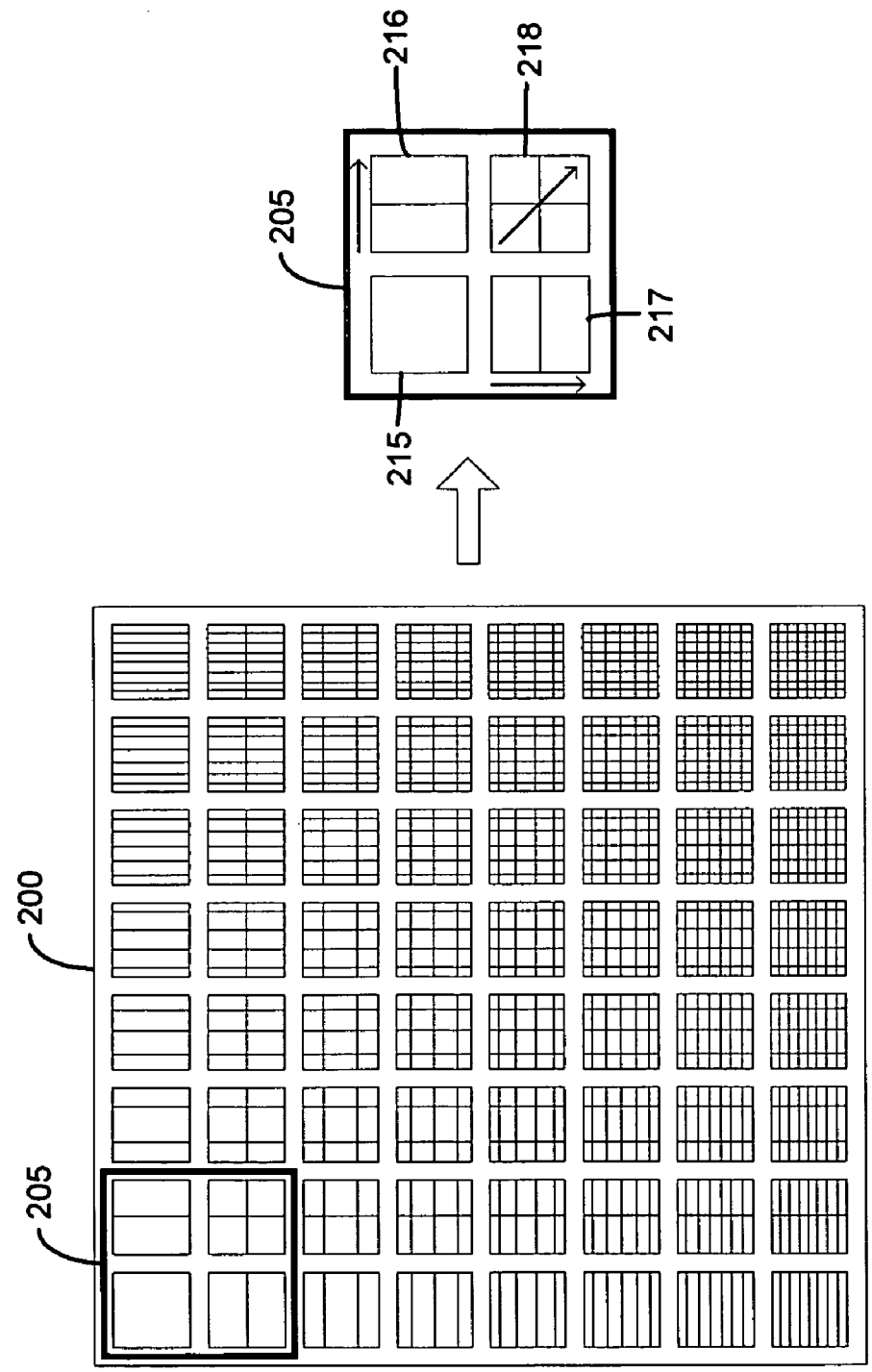
FIG. 2 is a diagram plotting discrete cosine transform basis vectors with a partial enlargement of four of the basis vectors according to aspects of the subject matter described herein.

FIG. 2 is a diagram plotting discrete cosine transform basis vectors with a partial enlargement of four of the basis vectors according to aspects of the subject matter described herein. For an 8×8 discrete cosine transform, the corresponding basis vectors of the DCT coefficient $A_{i,j}$ are denoted as $C^{i,j}$, and all basis vectors $\{C^{i,j}\}_{8 \times 8}$ are represented in FIG. 2 (e.g., within the square 200). The basis vectors in the square 205 are shown in an enlarged view. Basis vector $C^{1,1}$ (i.e. vector 215) includes the average level of a block. Basis vector $C^{1,2}$ (i.e., vector 216) includes horizontal decrease variation information. Basis vector $C^{2,1}$ (i.e., vector 217) includes vertical decrease variation information. Basis vector $C_{2,2}$ (i.e., vector 218) includes diagonal variation information. These basis vectors cover the basic directional information and level information of a block. The elements of these basis matrices follow the following rules:

$$C^{1,1} = \begin{bmatrix} 0.25 & \cdots & 0.25 \\ \vdots & \ddots & \vdots \\ 0.25 & \cdots & 0.25 \end{bmatrix} \Rightarrow \check{C}^{1,1} = 0.25 \cdot \begin{bmatrix} 1 & 1 \\ 1 & 1 \end{bmatrix}, \quad (16)$$

-continued $$C^{1,2} = \begin{bmatrix} 0.1734 & \cdots & -0.1734 \\ \vdots & \ddots & \vdots \\ 0.1734 & \cdots & -0.1734 \end{bmatrix} \Rightarrow \check{C}^{1,2} = 0.1734 \cdot \begin{bmatrix} 1 & -1 \\ 1 & -1 \end{bmatrix},$$

$$C^{2,1} = \begin{bmatrix} 0.1734 & \cdots & 0.1734 \\ \vdots & \ddots & \vdots \\ -0.1734 & \cdots & -0.1734 \end{bmatrix} \Rightarrow \check{C}^{2,1}$$

$$= 0.1734 \cdot \begin{bmatrix} 1 & 1 \\ -1 & -1 \end{bmatrix},$$

$$C^{2,2} = \begin{bmatrix} 0.2405 & \cdots & -0.2405 \\ \vdots & \ddots & \vdots \\ -0.2405 & \cdots & 0.2405 \end{bmatrix} \Rightarrow \check{C}^{2,2}$$

$$= 0.2405 \cdot \begin{bmatrix} 1 & -1 \\ -1 & 1 \end{bmatrix}.$$

The absolute values of the four corner elements are equivalent, and the sub-matrix $\check{C}^{i,j}$ formed by four corner elements may be used to describe the variation property of the corresponding original basis $C^{1,1}$. For example, $\check{C}^{1,2}$ and $\check{C}^{2,1}$ show the decrease trend in horizontal and vertical directions respectively; $\check{C}^{2,2}$ exhibits the variation along diagonal direction. And all these four sub-matrices can be written as the product of one constant scalar and a 2×2 Hadamard transform basis. This can be used to build a bridge between the low frequency DCT coefficients and the Hadamard transform coefficients. Once a 2×2 matrix composed of pixels at a distance is obtained, the predicted low frequency coefficients can be calculated by a scaling operation and a Hadamard transform. The gradient information may be expressed by the difference among the DC components of the neighboring blocks in smooth area. Therefore, the variation of DC may be used to simulate the variation within a patch with the size same of image block, because the DC difference of neighboring blocks can be taken as the difference of pixel values in a distance of block's size.

Figure 3:
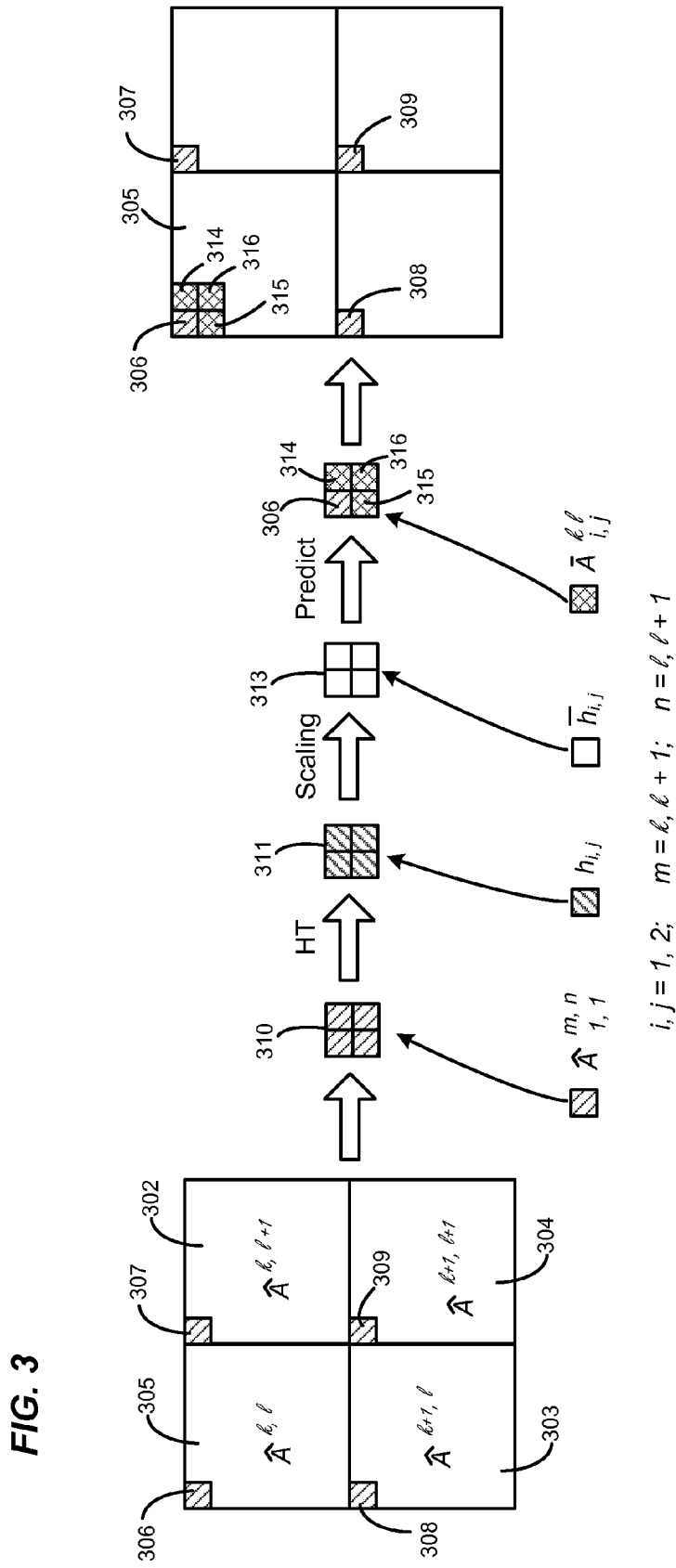
FIG. 3 illustrates a scheme of DC based low frequency AC prediction according to aspects of the subject matter described herein.

FIG. 3 illustrates a scheme of DC based low frequency AC prediction according to aspects of the subject matter described herein. When the quantized DCT coefficients of four neighboring blocks (positions (k, l), (k, l+1), (k+1, l) and (k+1, l+1), 305, 302, 303, and 304, respectively) only have DC components (306, 307, 308 and 309, respectively) that are non-zero, these four blocks are likely within a smooth variation area. The prediction of the three low frequency AC coefficients of (k, l)-th block may be determined by:
1. Obtaining the diagonal DC components (306, 307, 308 and 309) of the four neighboring blocks to form a 2×2 matrix (310);
2. Applying a Hadamard transform (HT) to the matrix 310 to construct a "HT matrix 311; and
3. Scaling the HT matrix 311 as desired by multiplying each entry of the HT matrix by distinct scaling factors to create a scaled matrix 313 that is used to predict the three low frequency AC coefficients (314, 315, and 316) corresponding to the DC component 306 of the upper left block (i.e., block 305).

A mathematical expression of the AC prediction algorithm may be described by the following equation:

$$\begin{bmatrix} \hat{A}_{1,1}^{k,l} & \hat{A}_{1,1}^{k,l+1} \\ \hat{A}_{1,1}^{k+1,l} & \hat{A}_{1,1}^{k+1,l+1} \end{bmatrix} \overset{HT}{\Longrightarrow} \begin{bmatrix} h_{11} & h_{12} \\ h_{21} & h_{22} \end{bmatrix} \overset{\otimes \begin{bmatrix} c_1 & c_2 \\ c_3 & c_4 \end{bmatrix}}{\Longrightarrow} \begin{bmatrix} \overline{h}_{11} & \overline{h}_{12} \\ \overline{h}_{21} & \overline{h}_{22} \end{bmatrix} = \begin{bmatrix} \blacksquare & \overline{A}_{1,2}^{k,l} \\ \overline{A}_{2,1}^{k,l} & \overline{A}_{2,2}^{k,l} \end{bmatrix} \quad (17)$$

with $\begin{bmatrix} c_1 & c_2 \\ c_3 & c_4 \end{bmatrix} = \begin{bmatrix} c/0.25 & c/0.1734 \\ c/0.1734 & c/0.2405 \end{bmatrix}$, with $c = 0.5$ As can be seen above, in one embodiment, compressed image restoration may be treated as a DCT coefficients recovery problem. The recovery procedure may be modeled as the construction of a route, which starts from the quantized coefficients node and terminates at the original transformed coefficients node in an $N^2$-dimensional vector space. Using a partial differential equation diffusion method, total variation regularization may be used to realize stepwise route node selection. In addition, two constraints on high dimensional vector space may be used to restrict the route within the feasible space. The first constraint relates to the quantization operation, while the second constraint relates to a property of the discrete cosine transform.

Figure 4:
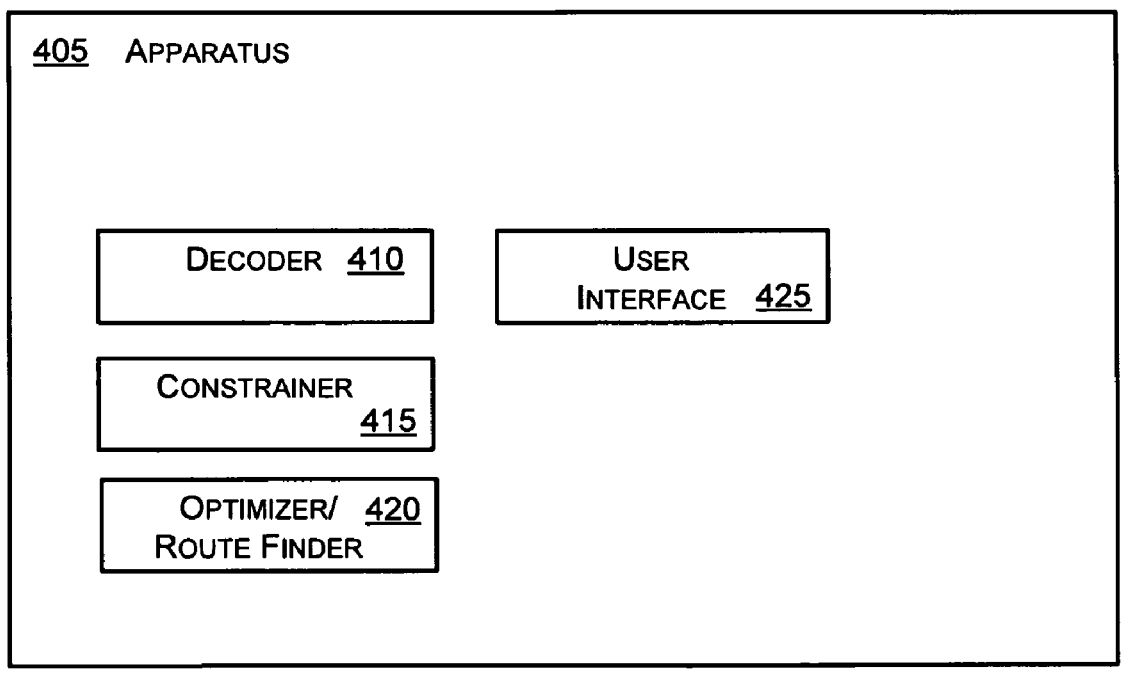
FIG. 4 is a block diagram illustrating exemplary components that may be included in an apparatus arranged in accordance with aspects of the subject matter described herein.

FIG. 4 is a block diagram illustrating exemplary components that may be included in an apparatus arranged in accordance with aspects of the subject matter described herein. The apparatus 405 is only one example of a suitable environment and is not intended to suggest any limitation as to the scope of use or functionality of aspects of the subject matter described herein. Neither should the apparatus 405 be interpreted as having any dependency or requirement relating to any one or combination of components illustrated in the apparatus 405.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Computer-readable media as described herein may be any available media that can be accessed by a computer and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to FIG. 4, the apparatus 405 may include a decoder 410, a constrainer 415, an optimizer/route finder 420, and a user interface 425. The components illustrated in FIG. 4 are exemplary and are not meant to be all-inclusive of components that may be needed or included. In other embodiments, the components or functions described in conjunction with FIG. 4 may be included in other components or placed in subcomponents without departing from the spirit or scope of aspects of the subject matter described herein.

The decoder 410 is operable to receive data corresponding to a first image and to determine a compression algorithm used to create the data. For example, the decoder 410 may be operable to determine that the data corresponds to a JPEQ image that has been compressed using a JPEQ compression algorithm. The decoder 410 may also be able to determine relevant characteristics about the compression algorithm such as block size and the like.

The constrainer 415 is operable to provide one or more constraints regarding a set of allowable solutions in creating a second (e.g., restoration) image from the data. The set of allowable solutions may include spectral components (e.g., coefficients) related to the second image. As described previously, two separate constraints may be used to trim the set of allowable solutions. The constrainer 415 may operate to predict one or more AC components using DC components from four adjoining blocks as described previously.

The optimizer/route finder 420 is operable to find a solution in the set of allowable solutions via an iterative function.

The optimizer/route finder 420 is further operable to receive constraints from the constrainer 415 in conjunction with finding the solution. The solution corresponds to the restoration image that is determined to be the closest to the original image by the iterative function at a particular iteration. For an example of an iterative function, see equations 9 and 10 above.

The user interfaced 425 may display a restoration image provided by the other components and may be used to specify parameters such as how many iterations are to be performed by the optimizer/router finder 420.

Figure 5:
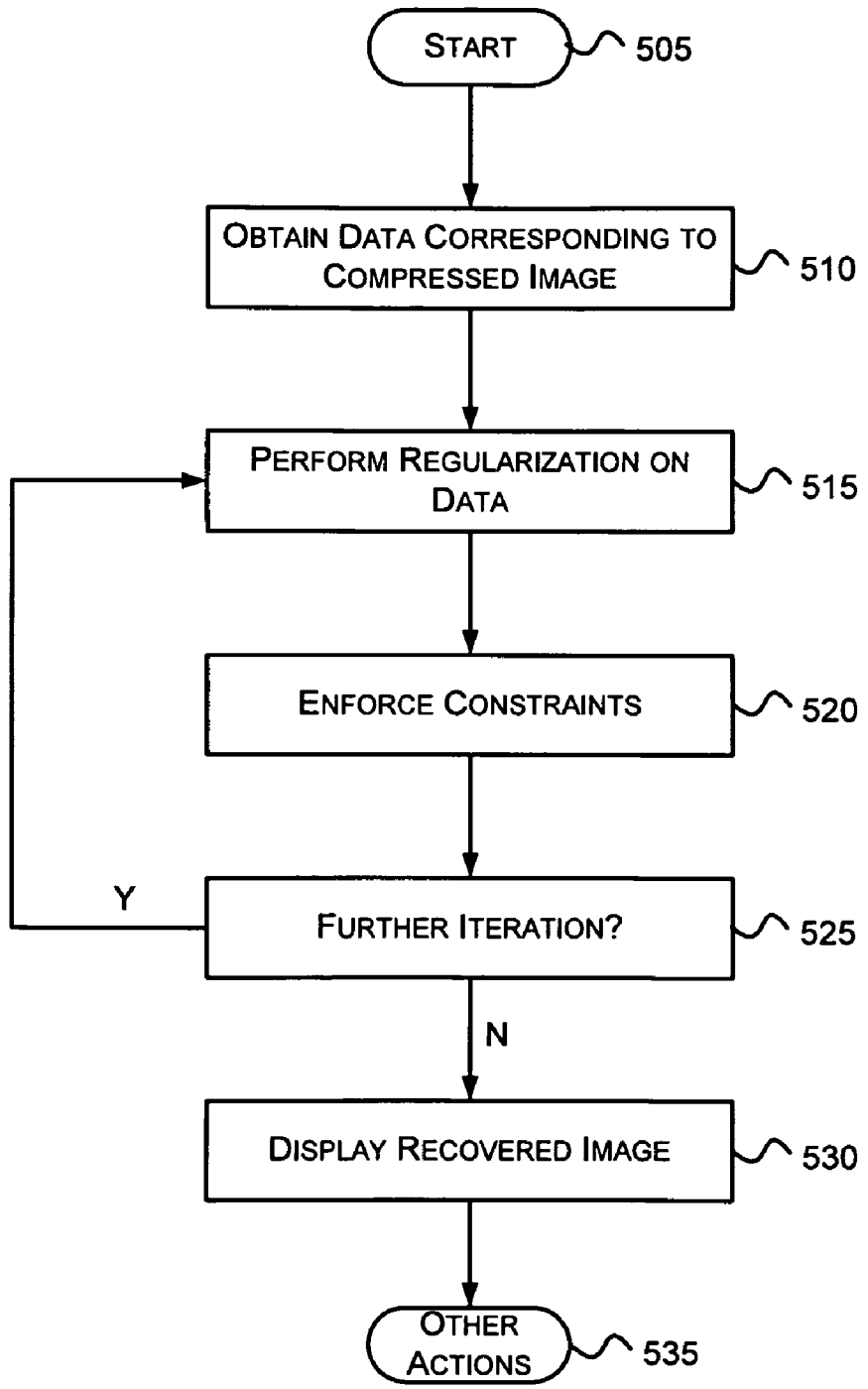
FIG. 5 is a flow diagram that generally represents one exemplary embodiment of actions that may occur in image restoration in accordance with aspects of the subject matter described herein.
Figure 6:
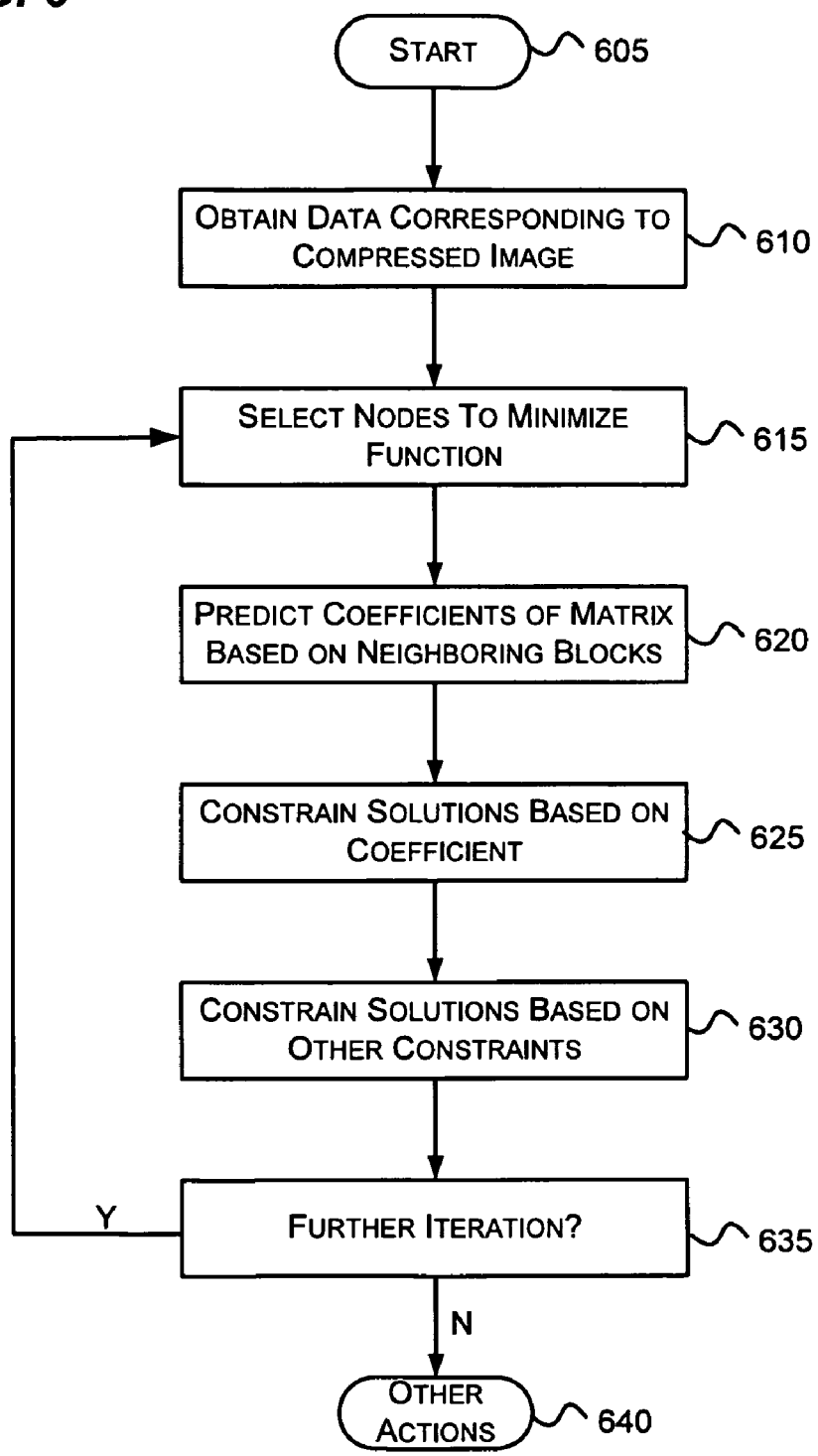
FIG. 6 is a flow diagram that generally represents another exemplary embodiment of actions that may occur in image restoration in accordance with aspects of the subject matter described herein

FIGS. 5-6 are flow diagrams that general represent actions that may occur in image restoration in accordance with aspects of the subject matter described herein. For simplicity of explanation, the methodology described in conjunction with FIGS. 5-6 are depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents one exemplary embodiment of actions that may occur in image restoration in accordance with aspects of the subject matter described herein. At block 505, the actions begin.

At block 510, data corresponding to a compressed image is obtained. For example, referring to FIG. 4, the decoder 410 may obtain data that corresponds to a compressed image. The data may be created via a lossy compression algorithm that utilizes a set of discrete coefficients during compression. One such exemplary algorithm is the JPEG algorithm although aspects of the subject matter described herein may also be applied to other algorithms that use discrete coefficients.

After the data is obtained, a second image may be constructed from the data. In constructing the second image, spectral information may be recovered by performing the actions indicated in blocks 515-525.

At block 515, regularization is performed on the data. For example, referring to FIG. 4, the optimizer/route finder 420 may use partial differential equations to find a route though the vector space shown in FIG. 1. The regularization may utilize an iterative function where at least some values of the function are dependent on (e.g., input from) values computed in (e.g., output from) a previous iteration.

At block 520, constraints are enforced. For example, referring to FIG. 4, the constrainer 415 may impose constraints on the route chosen by the optimizer/route finder 420. These constraints may be enforced during the route finding process to limit the solution space available to the regularization.

At block 525, a determination is made of whether a further iteration of the regularization algorithm is needed or desired. If a further iteration is to be performed, the actions continue at block 515; otherwise, the actions continue at block 530. For example, referring to FIG. 4, depending on configuration data entered via the user interface 425 or otherwise, the optimizer/route finder 420 may perform another iteration of the route finding algorithm to attempt to find a better image recovery for the compressed image.

At block 530, the recovered image is optionally displayed. For example, referring to FIG. 4, the user interface 425 may be used to display the image obtained from the compressed data.

At block 535, other actions may optionally be performed as desired.

FIG. 6 is a flow diagram that generally represents another exemplary embodiment of actions that may occur in image restoration in accordance with aspects of the subject matter described herein. At block 605, the actions begin.

At block 610, data corresponding to a compressed image is obtained. For example, referring to FIG. 4, the decoder 410 may obtain data that corresponds to a compressed image. The data may be created via a lossy compression algorithm that utilizes a set of discrete coefficients during compression.

At block 615, nodes are selected to minimize a function. The nodes represent possible solutions to the function. For example, referring to FIG. 4, the optimizer/route finder 420 may use partial differential equations to find nodes on the vector space shown in FIG. 1.

At block 620, the solution is constrained based on coefficients found in four neighboring blocks data. For example, DC components may be used to predict AC components as described previously. For example, referring to FIG. 4, the constrainer 415 may examine neighboring blocks and compute AC components as described previously. In calculating the AC components a Hadamard transform matrix may be used as described previously.

At block 630, the solution space may be constrained based on other constraints. For example, the solution space may be constrained based on equation 11 above.

At block 635, a determination is made of whether a further iteration is needed or desired. If a further iteration is to be performed, the actions continue at block 615; otherwise, the actions continue at block 640. For example, referring to FIG. 4, depending on configuration data entered via the user interface 425 or otherwise, the optimizer/route finder 420 may perform another iteration of the node selection algorithm to attempt to find a better image recovery for the compressed image.

At block 535, other actions may optionally be performed as desired.

As can be seen from the foregoing detailed description, aspects have been described related to image restoration for compressed images. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    obtaining data that has been created through an algorithm that compresses a first image, the algorithm comprising a lossy JPEG compression algorithm, the algorithm utilizing a set of discrete DC coefficients and AC coefficients during compression; and
    constructing a second image from the data and recovering spectral information by performing actions, comprising:
        performing nonlinear partial differential equation regularization on the data; and enforcing constraints during the partial differential equation regularization predicting at least one of the AC coefficients using at least the DC coefficients from four neighboring blocks by multiplying those DC coefficients by a Hadamard transform matrix.

2. The method of claim 1, wherein performing nonlinear partial differential equation regularization comprises minimizing a sum that includes a value that is based on a gradient.

3. The method of claim 1, wherein performing nonlinear partial differential equation regularization comprises iteratively computing successive values, at least some of the values dependent on a value computed in a previous iteration.

4. The method of claim 1, wherein enforcing constraints during the partial differential equation regularization comprises reducing a space of possible routes selectable by the nonlinear partial differential equation regularization.

5. The method of claim 1, wherein the spectral information comprises coefficients corresponding to the coefficients used for compression.

6. A computer storage medium having computer-executable instructions, which when executed perform actions, comprising:
    obtaining data produced by a lossy compression algorithm, the lossy compression algorithm producing the data by operating on an image;
    selecting nodes that minimize a function, the nodes representing possible solutions to the function;
    predicting a coefficient of a matrix based on coefficients found in four neighboring blocks of the data, the neighboring blocks encoding information about the image;
    wherein predicting a coefficient of a matrix based on coefficients found in four neighboring blocks of the data comprises applying a Hadamard transform to the coefficients found in four neighboring blocks of the data; and
    constraining the solutions to the function based on the coefficient.

7. The computer storage medium of claim 6, wherein the lossy compression algorithm comprises an algorithm that uses a discrete cosine transform.

8. The computer storage medium of claim 6, wherein the lossy compression algorithm comprises a JPEG algorithm having AC coefficients and DC coefficients.

9. The computer storage medium of claim 6, wherein predicting a coefficient of a matrix based on coefficients found in four neighboring blocks of the data comprises predicting at least one of the AC coefficients.

10. The computer storage medium of claim 6, wherein predicting a coefficient of a matrix based on coefficients found in four neighboring blocks of the data further comprises applying a scaling factor to a result produced by the Hadamard transform.

11. The computer storage medium of claim 6, wherein the function receives an input and produces an output, and further comprising iteratively evaluating the function and using as the input a previous evaluation of the function and providing output usable in a subsequent iteration of the function.

12. The computer storage medium of claim 6, wherein the function comprises a partial differential equation.

13. A system for restoring compressed images comprising a processor which is programmed to control:
    a decoder operable to receive data corresponding to a first image and to determine a compression algorithm used to create the data from the first image;
    a constrainer operable to provide one or more constraints regarding a set of allowable solutions in creating a second image from the data, the set of allowable solutions including spectral components related to the second image;
    an optimizer operable to find a solution in the set of allowable solutions via an iterative function, the optimizer further operable to receive the one or more constraints in conjunction with finding the solution, the solution corresponding to an image that is determined to be closest to the first image by the iterative function at a particular iteration of the iterative function;
    wherein the iterative function comprises a total variation regularization function without a fidelity term; and
    wherein the total variation regularization function is solved via a spatial domain dynamic adjustment of the solution that is iteratively calculated by solving a corresponding Euler-Lagrange equation based on an assigned evolution time.

14. The system of claim 13, wherein the compression algorithm comprises an algorithm that uses discrete cosine transforms in creating the data from the first image, the discrete cosine transform utilizing a set of coefficients, wherein one of the coefficient corresponds to an average value of pixels within a block of the first image while the other components correspond to spatial frequencies within the block.

15. The system of claim 14, wherein the constrainer is further operable to determine a constraint regarding the set of allowable solutions by using coefficients from four adjoining blocks.

* * * * *